Patented June 18, 1929.

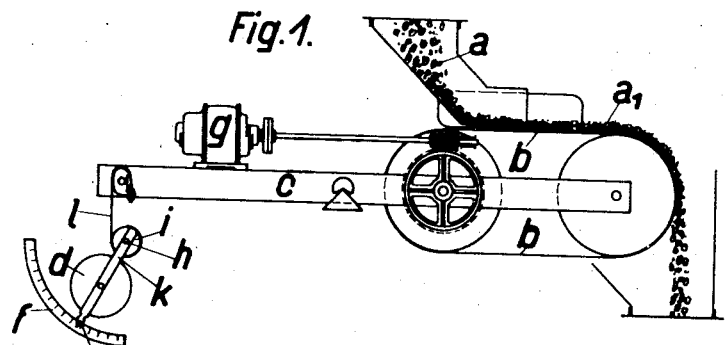
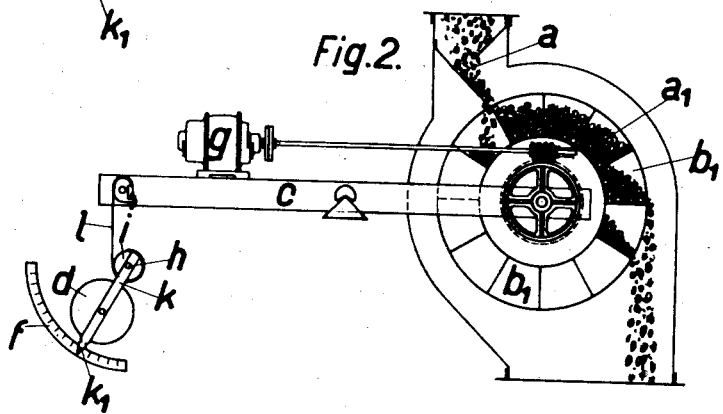
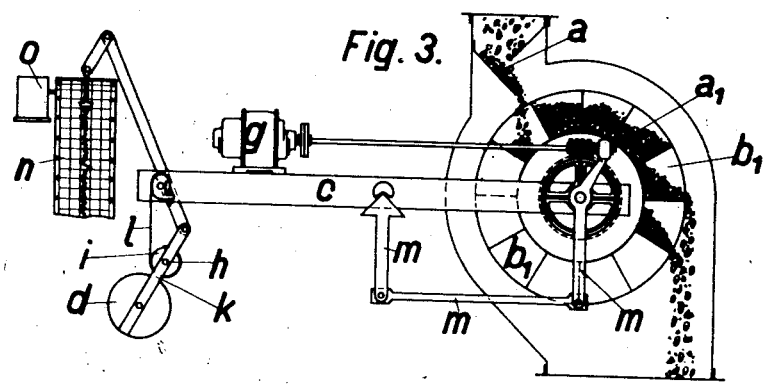

1,717,564

UNITED STATES PATENT OFFICE.

JOHANNES IHLEFELDT, OF DESSAU, GERMANY, ASSIGNOR TO G. POLYSIUS, OF DESSAU, GERMANY, A PARTNERSHIP.

APPARATUS FOR WEIGHING CONTINUOUSLY-MOVING GRANULAR MATERIAL.

Application filed June 8, 1927, Serial No. 197,491, and in Germany March 18, 1927.

This invention relates to a novel apparatus for weighing continuously moving granular material. According to my invention this apparatus consists essentially of a balance beam which is inserted into the conveying device for said granular material.

In order to ascertain the quantity and therewith the weight of granular materials of all kinds which are continuously moving, automatic balances or so-called conveyer-balances have so far been used. The former balances are connected with the disadvantage that the material to be weighed will be caused to accumulate, whereby greater quantities of the material must be conveyed at times, thus causing the motion of the material to become intermittent, which will easily result in a clogging up of the apparatus serving for the further conveying process. This disadvantage can only be avoided by providing an especial distributing apparatus below the balance which will render the plant complicated and expensive. The second above-mentioned class of balances which are usually inserted into conveying devices extraordinarily increase the dimensions of the plant in longitudinal direction in order to be able to weigh the individual portions of the material positioned on the respective belt-section of the conveyor at greater intervals of time, which is necessary for properly carrying out the process of weighing.

According to my invention these disadvantages are avoided by having the continuously moving material conveyed over a proper conveying device, such as an endless conveying belt or also a drum with partitions at its circumference, said device being supported by one end of a balance beam, while a motor is preferably provided on the other end of said beam, said motor serving for driving said device.

My invention is more fully described below, reference being had to the accompanying drawing, of which Fig. 1 is a diagrammatical representation of one form of the apparatus inserted according to my inveniton into the conveyer for the granular material, Fig. 2 is a similar representation of a modified form of said apparatus, and Fig. 3 of a further modified form of the apparatus including a parallelogram device and an indicating or counting device with a clockwork.

Referring now more particularly to the drawing, the continuously moving granular material is supplied according to Fig. 1 to a short endless conveying belt $b$ which moves with a constant velocity, or also to a drum $b^1$ having a plurality of cells at its circumference, as shown in Fig. 2. This belt $b$ or drum $b^1$ is supported in any convenient manner by the beam $c$ of a balance and driven by means of a motor $g$ which is preferably mounted on the other end of said beam $c$. According to the quantity of the material $a^1$ which is positioned at a time upon the endless conveying belt $b$ the weight $d$ will be adjusted to be positioned either at a higher or at a lower point. The deflection of the beam of the balance is transmitted to the pointer $k^1$ by means of the band $l$ which is laid around the cylinder $i$ and fixed with one of its ends thereon, said cylinder being mounted rotatably around its axis $h$. The deflection of the beam $c$ of the balance will thus be transmitted to the lever $k$ secured to said cylinder $i$ and carrying the weight $d$. For the sake of simplicity, the pointer $k^1$ is shown as being positioned in the prolongation of said lever $k$.

In the drawing the endless conveying belt $b$ as well as the drum $b^1$ with its several partitions or cells are shown as being fixedly connected to the beam $c$ of the balance. These devices, however, may also be mounted by a supporting device of the form of a parallelogram $m$, as shown in Fig. 3; this resulting into a greater accuracy in determining the weight of the continuously moving granular material, because in this case the entire load which is imposed upon the balance will be concentrated into a single point. The velocity of the conveying belt $b$, as shown in Fig. 1, and in consequence thereof also the quantity of moving material is constant in case the weight $d$ is kept in the same position. The scale $f$ may therefore be immediately so graduated that it will indicate the quantity of material which passes in a unit of time, such as for instance in kilograms per hour or the like. This method of course has the disadvantage that in the first place it will be necessary to constantly inspect the balance beam and its deflection and in the second place, that small differences of weight will have no effect upon the indication. The position of the pointer may immediately be transmitted according to Fig. 3 to a recording device *n* which is driven by a clock work *o*, said device serving for continuously recording the load which is imposed upon the balance beam. The product of the average value of the weight and the period of time during which the load acts divided by the period of time during which each particle of the material is positioned upon the balance will then represent the exact total weight of the continuously moving material.

I claim:

1. Apparatus for weighing granular material, comprising means for moving granular material in a continuous path, said means including a balance beam carrying on the one of its sides a conveying device, a motor mounted on the other side of said balance beam, and operative connecting means between said motor and said conveying device.

2. Apparatus for weighing granular material, comprising a conveying device adapted to move the granular material in a continuous path, a balance beam, and a device in the form of a parallelogram adapted to support said conveying device on one end of said balance beam so as to have the load of said material imposed upon said balance beam concentrated at one point thereof, a motor mounted on said balance beam, and a flexible shaft for driving said conveying device by said motor.

3. Apparatus for weighing granular material, as specified by claim 1, having indicating means associated with the balance beam, said indicating means comprising a weight operatively associated with the balance beam, and a graduated scale and pointer adapted to indicate the deflection of said balance beam and said weight and therewith the weight of the material which passes over the conveying device.

In testimony whereof I affix my signature.

JOHANNES IHLEFELDT.